US005105109A

United States Patent [19]

Nakai et al.

[11] Patent Number: 5,105,109

[45] Date of Patent: Apr. 14, 1992

[54] SUPPORT STRUCTURE FOR A LINEAR MOTOR DRIVE TYPE OF ELEVATOR

[75] Inventors: Keiichiro Nakai, Tokyo; Manabu Suganuma, Narita, both of Japan

[73] Assignee: Otis Elevator Company, Farmington, Conn.

[21] Appl. No.: 442,883

[22] Filed: Nov. 29, 1989

[30] Foreign Application Priority Data

Dec. 9, 1988 [JP] Japan ................................ 63-311540

[51] Int. Cl.$^5$ .......................... H02K 41/00; B66B 7/02

[52] U.S. Cl. .......................................... 310/12; 187/95

[58] Field of Search ........................ 310/12, 91; 187/95

[56] References Cited

U.S. PATENT DOCUMENTS 4,423,361 12/1983 Stenudd et al. ..................... 318/135

4,570,753 2/1986 Ohta et al. ......................... 310/12 X 5,033,588 7/1991 Nakai et al. ........................... 187/95

FOREIGN PATENT DOCUMENTS 0372574 6/1990 European Pat. Off. .............. 187/95

*Primary Examiner*—Steven L. Stephan
*Assistant Examiner*—Judson H. Jones
*Attorney, Agent, or Firm*—William W. Jones

[57] ABSTRACT

A stator member of a linear motor type elevator system is mounted in the elevator hoistway so as to permit vibrational movement of the stator to occur. The stator mounts permit rotational movement of the stator and also apply a longitudinal tensioning force to the stator. The tensioning force is supplied by a spring which absorbs vibrations of the stator.

3 Claims, 4 Drawing Sheets

SUPPORT STRUCTURE FOR A LINEAR MOTOR DRIVE TYPE OF ELEVATOR

DESCRIPTION

1. Technical Field

This invention relates to a mounting system for mounting a secondary conductor or stator of a linear motor in an elevator hoistway.

2. Background Art

The traction type of elevator is the conventional type of elevator widely used throughout the world. This type of elevator utilizes a machine room which is provided above the lift, in which a traction machine is installed and whereon ropes are hung, on respective ends of which ropes a car and a counterweight are suspended.

The dimension of this machine is relatively large, and at the same time in the machine room are installed a brake apparatus and other control apparatus. Thus the machine room occupies space in a building which could be put to use in other more beneficial ways. Further, as the weight of the apparatus settled in the machine room increases to come extent, the structure of the machine room as to be expensive due to the necessary strengthening of the machine room floor.

Accordingly, in order to solve the above problem, an elevator having a linear motor as its power source has been proposed. The linear motor itself moves in a well known manner in a linear direction and there is of no need of a motor which needs a traction machine or reduction device and traction sheaves, whereby the whole structure is quite lightweight. As the result, a machine room for a traction machine is not necessary and a big advantage for the elevator system as a whole is obtained.

DISCLOSURE OF THE INVENTION

The above linear motor type of elevator has still many technical problems to be solved. Particularly, from a view point of safety there are the problems to be solved in the stator fastened to the building and functioning as the secondary side of the linear motor. The stator corresponds in length to the number of floors of the building, whereby the supporting structure for the stator presents a problem.

In any geographical area subject to earthquakes, breakage of the stator may occur due to the vibration and shock of the earthquakes.

In accordance with the present invention, in order to solve the aforesaid problem, a mounting structure is proposed for a linear motor elevator stator functioning as a secondary side of the linear motor and over which a moving element functioning as a primary side of the motor travels. One end of the stator is fastened to the building through a first support means which allows vibration of the stator, and the other end thereof is fastened to the building through a second support means which supplies a pre-determined tension to the stator and which absorbs the vibrations of the stator.

The linear motor stator which functions as a secondary side of the linear motor is fastened to a hoistway of the lift mounted on a building on an upper support channel mounted above the hoistway through a revolving, coupling member which allows the stator to rotate within a certain range. The other end of the stator is fastened to the floor at the base of the hoistway through a support member consisting of a tension supplying means which allows the stator to swing within a certain range and supplies a pre-determined tension to the stator. Accordingly, if the displacement of the stator is allowed by the movement of the coupling means and by the tension supply means the vibration and the like is reduced and absorbed, so that the stator is protected from breakage.

One object of the present invention is thus to provide a structure of a linear motor driving elevator which is quite safely operated and resistant to vibrations.

The following are the explanation of the embodiment of the present invention referring to the drawings attached.

BEST MODE FOR CARRYING OUT THE INVENTION

Figure 1:
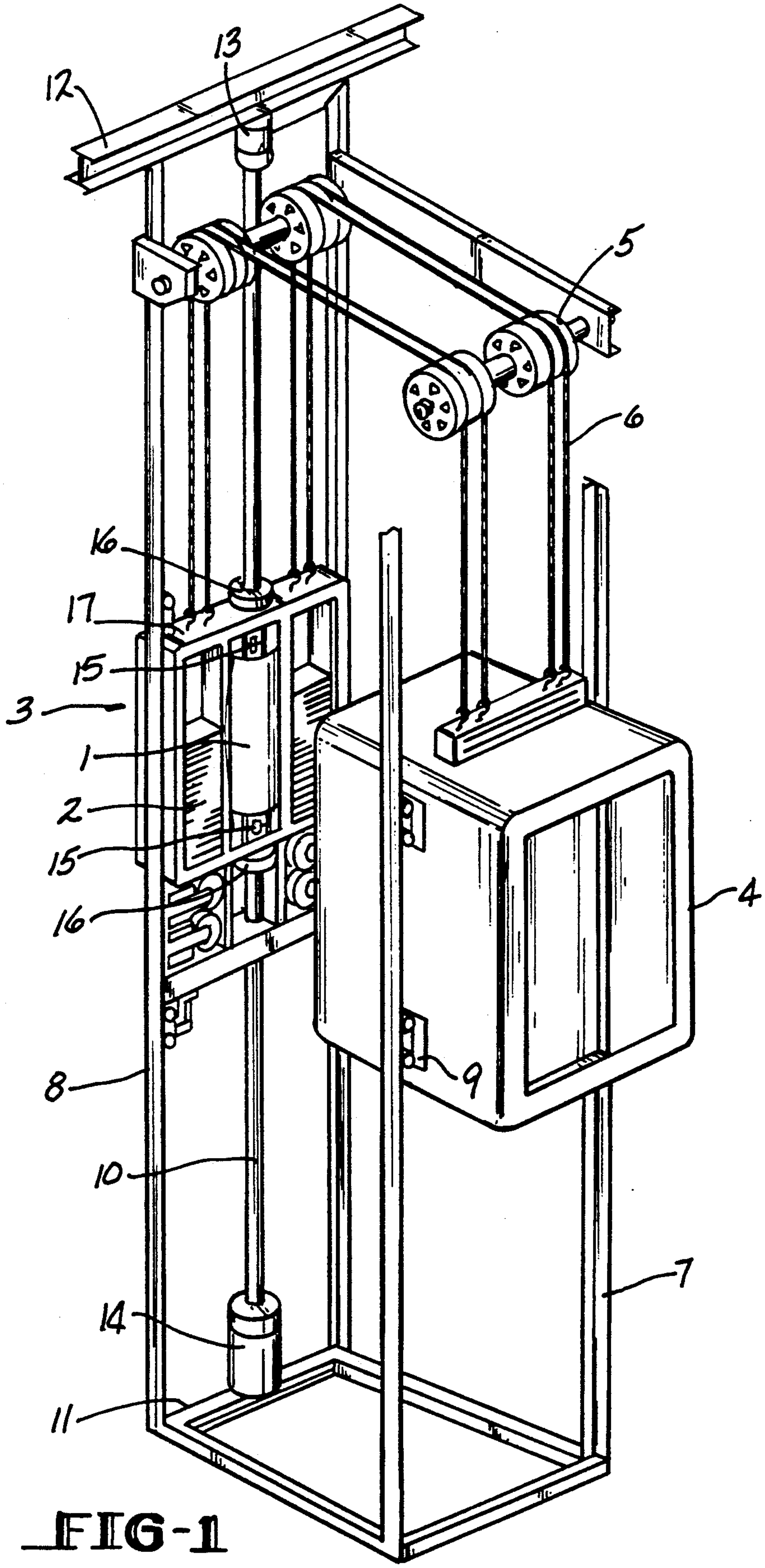
FIG. 1 is a schematic diagram of a linear motor drive type of elevator.

FIG. 1 is a schematic diagram of a linear motor drive type of elevator according to the present invention, especially as to cylindrical linear motor described as follows.

A cylindrical linear motor consists of a cylindrical moving element 1 and a column 10 as a stator. This cylindrical moving element 1 functions as the primary side of this motor. Counterweights 2 are installed in a casing consisting of a channel member to form as a whole a counterweight 3 for a car 4. This counterweight 3 is usually set in its weight as 1.5 times that of the empty car 4. The car 4 and the counterweight 3 are connected by four ropes 6 through four sheaves 5 provided above. Further both the car and the counterweight have guide rails 7 and 8 respectively on both sides thereof. The car 4 engages its guide rails 7 via slide members 9. The column 10 of the stator side has a steel core coated with an aluminum alloy. The column 10 passes through the cylindrical moving element 1 at the middle portion of the guide rails 8 for the counterweight. The lower end portion of the column 10 is fastened through a support member 14 to the lower support portion of a support frame 11 secured to the lower part of the guide rail 8. The upper end of the column 10 is fastened through a support member 13 to an upper support consisting of a support channel 12.

In the cylindrical linear motor a pre-determined gap has to be provided between the primary side and the secondary side, and in order to maintain the gap the linear motor of the present invention is supported by the rollers 15 provided on both upper and lower ends of the motor. Further, considering the change of this gap due to vibration of the linear motor, of the wearing of the rollers 15, gap sensors 16 are provided on the upper and lower portions of the casing frame 17. In FIG. 1, a linear motor is shown as being installed in the counterweight, however it is also possible to install the linear motor on the car.

Figure 2:
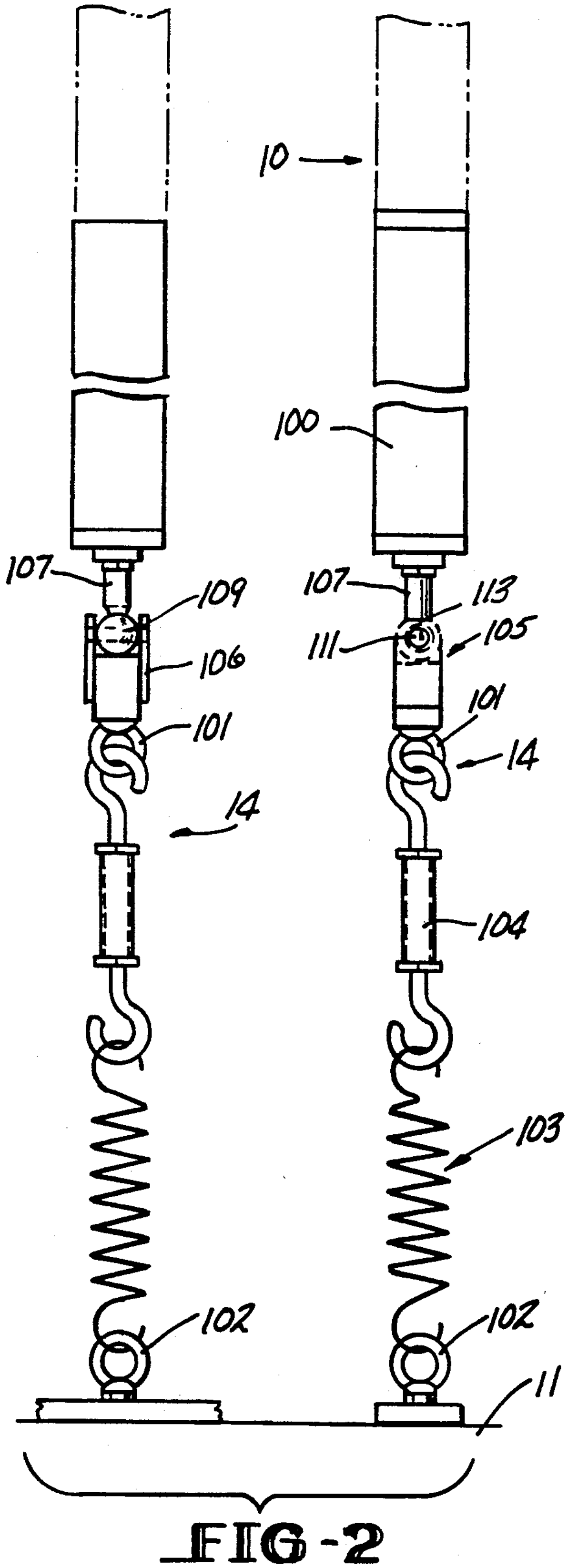
FIG. 2 shows the lower support structure for a column as a stator of a linear motor.

Next, FIG. 2 is explained. This figure shows the structure of the lower support member 14 for the column 10. As mentioned above, normally the column is made of steel core and aluminum alloy coating, and the total length is adjusted by connecting an extension 100 on one end thereof. On the free end of the extension there is mounted a ball joint 105 having an eyebolt 101. On the floor an eyebolt 102 is fastened through the support frame 11 which is connected to the lower ends of both of the guide rails 8 of the linear motor. The column 10 is kept vertical by connecting the eyebolts 101 and 102 with the coil spring 103 and turnbuckle 104, both of which have the hooks on both ends thereof respectively. The turnbuckle 104 can add a specific tension to the column 10 by regulating the distance between the spring 103 and the joint 102. Further, the provision of the turnbuckle 104 causes an easy regulation of the tension to the column 10 and easy assembly of the spring 103.

The ball joint 105 has a structure that holds a ball 109 by a pair of yokes 106 which are connected to the eyebolt 101 and the ball 109 is kept therein by a pin 111 penetrating the pair of yokes 106, and the ball 109. On the other hand, the end of the column has a shaft 107 which has a ring 113 which accepts the ball 109. Accordingly, due to this construction, the yokes 106 can rotate approximately 36. around the shaft 107, further, in the plane perpendicular to the above rotating plane, it can also rotate within a certain angle. These structures will allow the column itself to vibrate within a certain angle.

Figure 3:
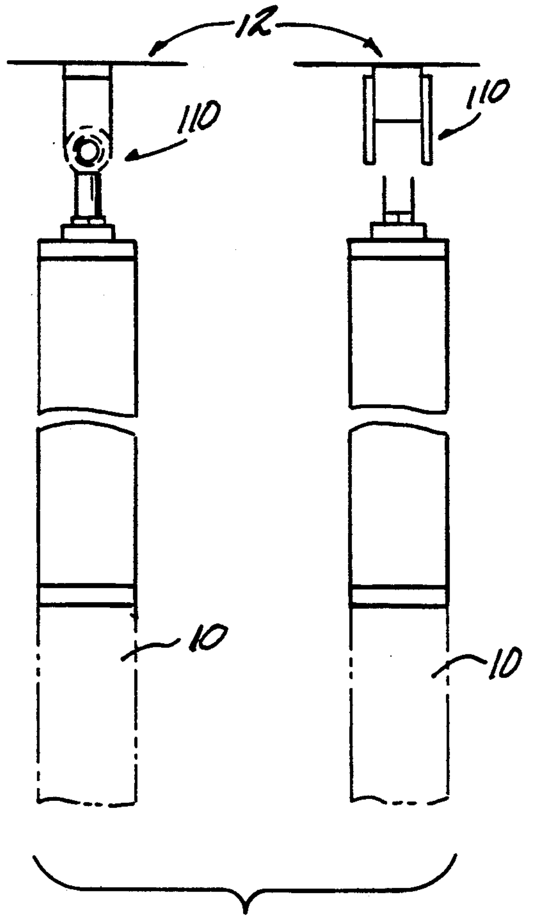
FIG. 3 shows the upper support structure.

FIG. 3 shows the structure of the upper support member 13 of the column 10. As to the upper support structure, although it is possible to connect the column 10 to the upper support channel 12 by using the same structure with the lower support structure, in this embodiment, because it is enough for either upper or lower support members to bear a spring to damp the vibration or the shock of the column, the support structure has merely a ball joint 110. This ball joint can also rotate within a certain range, and function to allow the displacement of the column due to the vibration with the lower support member.

Therefore, according to the support structure of the column 10 mentioned above, even if the vibration and shock acted on the column 10, it is possible to protect the column 10 effectively. Moreover, in the lower support structure of column 10, the structure consisting of a ball joint and coil spring without a turnbuckle is enough for effecting the functions thereof.

Figure 4:
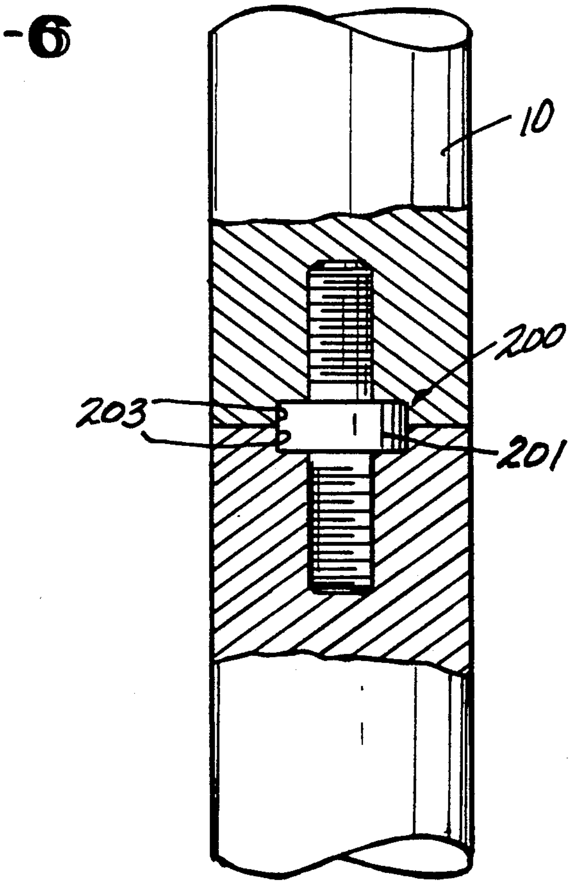
FIG. 4 shows how to connect columns partially in section.

FIG. 4 shows how to construct the column 10. The column 10 obtains its desired length, as mentioned above, by connecting a plurality of shorter column modules together.

In this kind of linear motor, because of the requirement of the substantially precise linearity along the whole length of the column 10, it is a problem to construct each column. It is necessary to connect the column modules in such a manner that steps between the outer surfaces of adjacent column modules are less than 0.1 mm.

Figure 5:
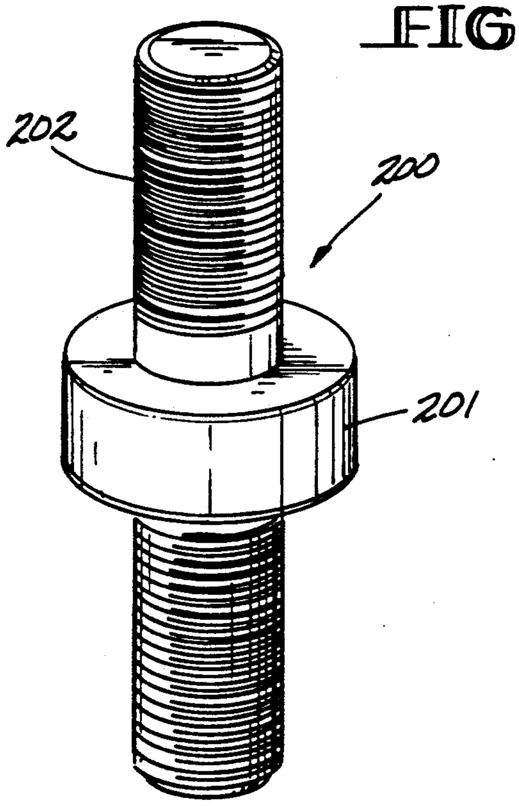
FIG. 5 shows a perspective view showing a column connecting member.

Therefore, a connecting member 200 shown in FIG. 5 is used. This connecting member 200 has the structure machined integrally by a lathe with a flange 201 formed in the middle portion of it and both ends thereof being threaded 202. On the other hand, the end portions of the column modules to be connected are drilled and threaded with counterbores 203 being formed therein so as to receive the flange 201.

Accordingly, it is possible to connect the column modules in such a manner that the allowable linearity of the whole column is satisfied by screwing one male screw portion of the above connecting member 200 into a female screw threaded on one end of the column module, the other male screw portion of the member 200 is screwed into another female screw of the other column module.

Figure 6:
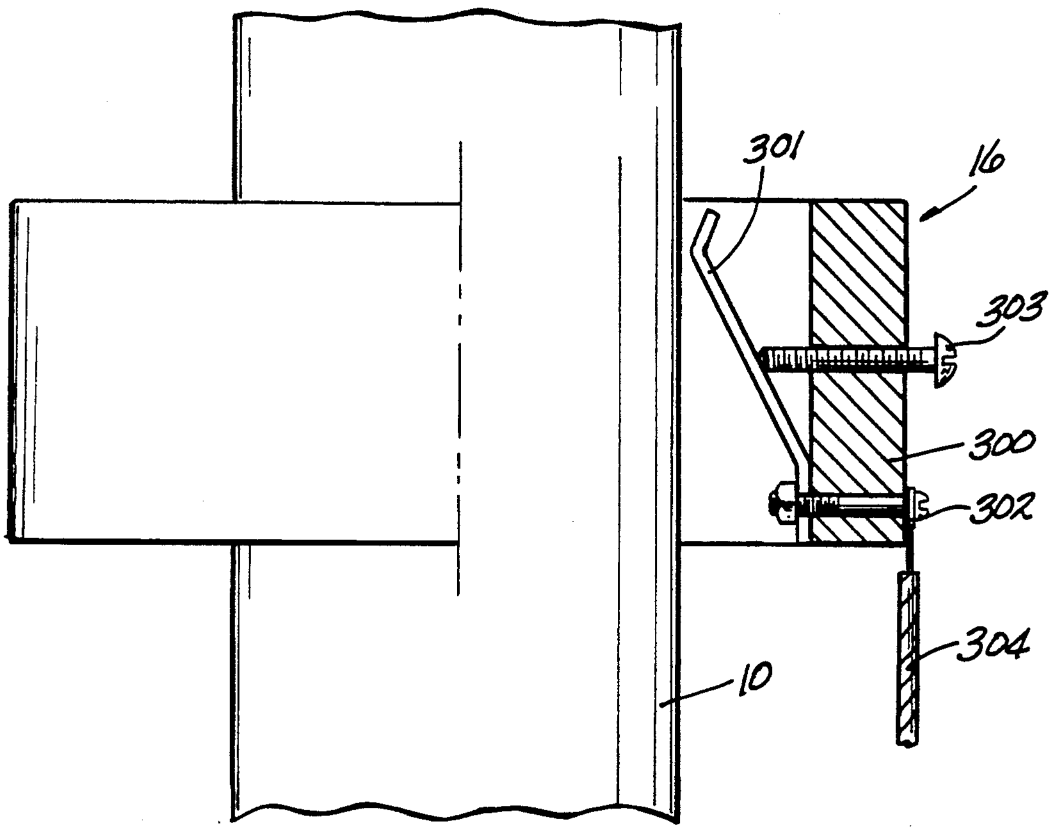
FIG. 6 shows a sectional view of a gap sensor.
Figure 7:
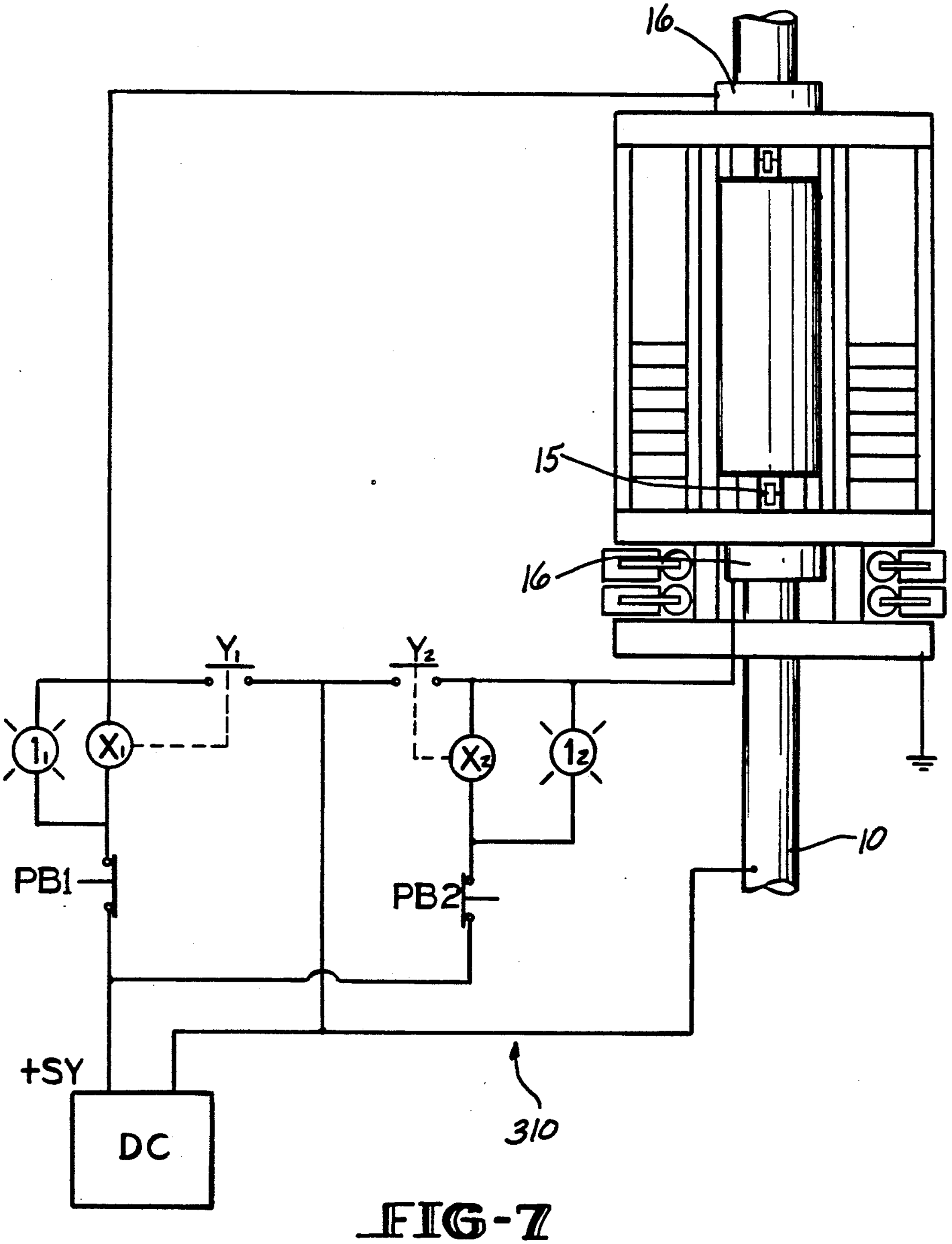
FIG. 7 shows a circuitry for the gap sensor.

FIGS. 6 and 7 shows a gap sensing system to detect the abnormality of the distance between the column and the moving element of the linear motor.

As mentioned above, normally in a linear motor, it is necessary to provide a certain gap between the stator of the secondary side and the moving element of the primary side and in order to maintain this gap a support mechanism becomes necessary.

Thus, as shown in FIG. 1, in this embodiment the support mechanism consists of the rollers 15.

However, these rollers have the problem that the gap between the stator and the moving element may change due to the wearing of the surface of the rollers by frequent up-down traveling of the elevator, breakage, or dropping out.

To detect abnormal changes of the gap, the gap sensors 16 are provided on both of the upper and lower sides of the linear motor.

As shown in FIGS. 6 and 7, the gap sensor system consists of a hollow casing 300, a conductive strip 301, a conductive strip fastening screw 302, a regulator screw 303 and a detecting circuit 310. One end of the conductive strip 301 is fastened to the inner side of the casing 300 by the fastening screw 302 and the other end thereof sets a change of the allowable gap between the column 10 and the moving element of the linear motor through the regulator screw 303.

Further, the fastening screw 302 and the column 10 are connected to a DC source through a lead wire 304 respectively. The conductive strip 301 is preferably installed at each of four positions of the quarter inner circumference of the casing 300, but it may be at three positions or a plurality of positions over five.

Furthermore, the conductive strip may be ring-shaped.

The detecting circuit 310 has a structure as shown in FIG. 7.

As mentioned above, if a change is generated in the gap due to the wearing of the rollers, the conductive strip 301 of the gap sensor 16 provided on both of the upper and lower sides of the linear motor touches the surface of the column, by which relay coils $X_1$ and $X_2$ are energized and the contacts of $Y_1$ and $Y_2$ which are normally open are closed. Because those relay coils and the contacts constitute a self holding circuit, the warning lamps $I_1$ and $I_2$ continue to light.

Further, a safety means may be provided, which reads the signal generated when the conductive strip 301 contacts the column 10 and operates the brake apparatus to stop the car 4.

In the above described embodiment, a support structure for a cylindrical type of linear motor, particularly a support structure of the column of the stator side is described, but the structure according to the present invention is not limited to the application to the cylindrical type of linear motor, but it is also applicable for instance to a support structure of a conductive plate of a flat type of linear motor.

According to the present invention, the stator functioning as a secondary side of a linear motor is provided on a building by being mounted in a hoistway of an elevator through a revolving coupling member provided on the upper and the lower portions of the stator. If a shock or vibration is imparted to the stator, the movement of the stator itself is appropriately controlled, particularly the vibrations or the like are reduced or absorbed by the spring provided on the lower portion of the stator to protect the stator effectively from damage such as breaking.

Since many changes and variations of the disclosed embodiment of the invention may be made without departing from the inventive concept, it is not intended to limit the invention otherwise than as required by the appended claims.

What is claimed is:

1. A support structure for a linear motor drive type of elevator consisting of a stator functioning as a secondary side of a linear motor and a moving element functioning as a primary side to said stator, the support structure being characterized in that one end of the stator is fastened to a building side through a first support means constituted as allowing vibration of the stator, and the other end of the stator is fastened to the building side through a secondary support means providing a pre-determined tension to the stator and absorbing vibration of the stator.

2. A support structure for a linear motor drive type of elevator as defined in claim 1 is characterized in that the said first support means comprises a revolving coupling means and the said secondary support means comprises a revolving coupling means and a coil spring.

3. A support structure for a linear motor drive type of elevator as defined in claim 2 is characterized in that the second support means further comprises a turn buckle interconnecting the revolving coupling means and the coil spring.

* * * * *